United States Patent
Suzuki et al.

(10) Patent No.: US 7,475,327 B2
(45) Date of Patent: Jan. 6, 2009

(54) OPTICAL DISC RECORDING AND REPRODUCING APPARATUS

(75) Inventors: Takuya Suzuki, Osaka (JP); Masanori Ujino, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 543 days.

(21) Appl. No.: 11/282,667

(22) Filed: Nov. 21, 2005

(65) Prior Publication Data

US 2006/0123317 A1    Jun. 8, 2006

(30) Foreign Application Priority Data

Nov. 22, 2004    (JP)    ............................ P2004-338129

(51) Int. Cl.
  *G11C 29/00*    (2006.01)
(52) U.S. Cl. ...................................... 714/769
(58) Field of Classification Search ................. 714/746, 714/763, 764, 47.18
  See application file for complete search history.

(56) References Cited

U.S. PATENT DOCUMENTS 6,577,569 B1 *   6/2003   Yamamoto et al. ........ 369/47.18
6,697,989 B1 *   2/2004   Maeda et al. ................ 714/755
6,792,538 B1 *   9/2004   Kuroda et al. ................ 713/193
7,124,258 B2 *  10/2006   Nakayama et al. .......... 711/154

FOREIGN PATENT DOCUMENTS

| JP | A-1991-044128 | 2/1991 |
| JP | UM-3004097 | 8/1994 |
| JP | A-1999-053847 | 2/1999 |
| JP | A-2001-351342 | 12/2001 |
| JP | A-2003-272148 | 9/2003 |
| JP | 2004-69605 A | 3/2004 |

* cited by examiner

*Primary Examiner*—Shelly A Chase
(74) *Attorney, Agent, or Firm*—Morgan, Lewis & Bockius LLP

(57) ABSTRACT

When an ECC error correction fails in both VMGI and VMGI_BUP, when the ECC error correction failed due to damage of PI in VMGI and PI for the same portion in VMGI_BUP is intact, in a case where the ECC error correction succeeds by using PI in VMGI_BUP as PI in VMGI, the ECC error correction succeeds by merging with a portion where the ECC error correction succeeded, or the ECC error correction succeeds by estimation based on the file size for the portion where the ECC error correction failed even by the merging and in a case where a re-writable optical disc is used, a correct management information file is newly written at an address different from the originally assigned address.

4 Claims, 4 Drawing Sheets

FIG. 3

VMGI_MAT

| | CONTENT |
|---|---|
| VMG_ID | IDENTIFIER OF VIDEO MANAGER |
| VMGI_SZ | SIZE OF VIDEO MANAGEMENT INFORMATION |
| VERN | VERSION NUMBER IN COMPLIANCE WITH DVD STANDARD |
| VMG_CAT | CATEGORY OF VIDEO MANAGER |
| VLMS_ID | VOLUME SET IDENTIFIER |
| VTS_Ns | NUMBER OF VIDEO TITLE SETS |
| PVR_ID | PROVIER'S ID |
| VMGM_VOBS_SA | START ADDRESS OF VMGM_VOBS |
| VMGI_MAT_EA | END ADDRESS OF VMGI_MAT |
| TT_SRPT_SA | START ADDRESS OF TT_SRPT |
| VTS_ATRT_SA | START ADDRESS OF VTS_ATRT |
| VMGM_V_ATR | VIDEO ATTRIBUTE OF VMGM |
| VMGM_AST_Ns | NUMBER OF AUDIO STREAMS IN VMGM |
| VMGM_AST_ATR | AUDIO STREAM ATTRIBUTE OF VMGM |
| VMGM_SPST_Ns | NUMBER OF SUB-PICTURE STREAMS IN VMGM |
| VMGM_SPST_ATR | SUB-PICTURE STREAM ATTRIBUTE OF VMGM | ns
OPTICAL DISC RECORDING AND REPRODUCING APPARATUS

BACKGROUND OF THE INVENTION

1. Field of the Invention

The present invention relates to an optical disc recording and reproducing apparatus that records/reproduces information in/from an optical disc, and more particularly, to processing of an ECC. (Error Checking and Correction) error correction when file management information is read from an optical disc.

2. Description of the Related Art

A flaw or dirt on an optical disc, such as a DVD (Digital Versatile Disc), causes data error during reproducing, which may make it difficult to read out recording data. Such being the case, an optical disc recording and reproducing apparatus in the related art performs ECC error correction processing in a digital signal processing section within the apparatus to enhance the reliability of an optical disc.

Incidentally, a management information file area is formed on the inner periphery side of an optical disc. A management information file is recorded concentrically in the management information file area. The management information file is information needed to record/reproduce data in/from a user area of the optical disc. Also, a backup file, to which the management information file is backed up as insurance against data destruction, is also recorded in a backup information area.

For example, the management information file of a DVD includes VMGI (VIDEO_TS.IFO), and the backup file includes VMGI_BUP (VIDEO_TS.BUP). VMGI (VIDEO_TS.IFO) indicates that VMGI, which is video management information, is stored in a file under the name of VIDEO_TS.IFO. VMGI includes VMGI_MAT that is the position information for each piece of control information, TT_SRPT for a title search, and information about video attributes and audio attributes of the title. VMGI_BUP (VIDEO_TS.BUP) indicates that backup data of VMGI is stored in a file under the name of VIDEO_TS.BUP. (See for example, JP-A-2001-351342 and JP-A-2003-272148.)

The optical disc recording and reproducing apparatus in the related art first reads the management information file when information is reproduced from an optical disc, and then tries to perform an ECC error correction when data in the management information file has an error. However, when the management information file has a flaw or dirt, the ECC error correction fails. The apparatus therefore reads the backup file next, and tries to perform the ECC error correction. However, when the backup file has a flaw or dirt, too, the ECC error correction fails as well. Accordingly, an error is indicated on the display section and the reproducing ends at that point in time. This is a problem of the optical disc recording and reproducing apparatus in the related art.

According to the technique in the related art of JP-A-2001-351342, when an error value of the original data is larger than a specific threshold value, reproducing is enabled by accessing the backup data according to the backup management information. However, reproducing ends in the event that an ECC error correction fails in both the management information file (management information) and the backup file (backup management information) as described above. This technique therefore cannot solve the problem discussed above.

The technique in the related art of JP-A-2003-272148 reproduces the file management information area, and plays an optical disc according to new file management information data when an error occurs. However, reproducing ends when the new file management information data is also damaged. This technique therefore cannot solve the problem discussed above, either.

SUMMARY OF THE INVENTION

The invention was devised to solve the problems as discussed above, and therefore has an object to provide an optical disc recording and reproducing apparatus furnished with a function of enabling an ECC error correction when the ECC error correction fails in both the management information file and the backup file due to flaws or the like.

According to a first aspect of the present invention, an optical disc recording and reproducing apparatus that records/reproduces information in/from an optical disc, which is characterized by being provided with a system controller including error correction information judgment means for judging, when an ECC error correction fails in both a management information file and a backup file of the management information file in an optical disc, whether the ECC error correction failed due to damage of row ECC error correction information in the management information file and row ECC error correction information for a same portion in the backup file is intact, first error correction judgment means for judging, when the row ECC error correction information is intact, whether the ECC error correction succeeds by using the row ECC error correction information in the backup file as the row ECC error correction information in the management information file, second error correction judgment means for judging, in a case where the ECC error correction failed and when a portion where the ECC error correction failed is specified and the portion does not overlap in the management information file and in the backup file, whether all ECC error corrections succeed by merging the portion with a portion where the ECC error correction succeeded, third error correction judgment means for tentatively performing padding in the portion where the ECC error correction failed even by the merging, and judging whether the ECC error correction succeeds by estimation based on a file size for the portion where the padding was performed, and file writing means for newly writing a correct management information file at an address different from an originally assigned address when the optical disc is a re-writable optical disc upon judgment of a success of the ECC error correction by any of the first, second, and third error correction judgment means.

According to this configuration, when an ECC error correction fails in both the management information file and the backup file of this file in the optical disc, when the ECC error correction failed due to damage of the row ECC error correction information in the management information file and the row ECC error correction information for the same portion in the backup file is intact, whether the ECC error correction succeeds by using the row ECC error correction information of the backup file as the row ECC error correction information in the management information file is judged.

When a portion where the ECC error correction failed is specified and this portion does not overlap in the management information file and in the backup file, whether all the ECC error corrections succeed by merging the portion with a portion where the ECC error correction succeeded is judged. For the portion where the ECC error correction failed even by the merging, padding is performed tentatively, and whether the ECC error correction succeeds by estimation based on the file size is judged for the portion where the padding was performed. Upon judgment of a success of any of the ECC error corrections, a correct management information file is written newly at an address different from the originally assigned address when the optical disc is a re-writable optical disc.

According to this configuration, when an ECC error correction fails in both the management information file and the backup file due to flaws or the like, the ECC error correction can be performed more accurately by using merged ECC information in these files. Also, even when the ECC error correction failed, the ECC error correction is performed by estimation based on the file size for the portion where the correction failed. Hence, even when both the management information file and the backup file have flaws or dirt, the management information can be obtained accurately at a higher possibility. In addition, when the optical disc is a re-writable optical disc, such as a DVD-RW, by writing the correct management information anew, it is possible to play the optical disc by another optical disc reproducing apparatus, such as a DVD player.

According to a second aspect of the present invention, an optical disc recording and reproducing apparatus that records/reproduces information in/from an optical disc, which is characterized by including a system controller that performs an ECC error correction by merging ECC error correction information in two files when the ECC error correction fails in both a management information file and a backup file of the information management file in an optical disc, wherein even when the ECC error correction fails, the system controller performs the ECC error correction by estimation based on other information for a portion where the correction failed.

According to this configuration, when an ECC error correction fails in both the management information file and the backup file of this file in the optical disc, the ECC error correction is performed by using merged ECC error correction information in these two files. Hence, even when the ECC error correction failed, the ECC error correction is performed by estimation based on other information for the portion where the correction failed.

According to this configuration, when an ECC error correction fails in both the management information file and the backup file due to flaws or the like, the ECC error correction can be performed more accurately by using merged ECC information in these files. Also, even when the ECC error correction failed, the ECC error correction is performed by estimation based on the other information for the portion where the correction failed. Hence, even when both the management information file and the backup file have flaws or dirt, the management information can be obtained accurately at a higher possibility. In addition, when the optical disc is a re-writable optical disc, such as a DVD-RW, by writing the correct management information anew, it is possible to play the optical disc by another optical disc reproducing apparatus, such as a DVD player.

The third aspect of the invention is the invention of the second aspect, wherein the other information is a file size. The ECC error correction is thus enabled by estimation based on the file size.

The fourth aspect of the present invention is the invention of the second aspect, wherein the system controller includes error correction information judgment means for judging, when the ECC error correction fails in both the management information file and the backup file of the management information file in the optical disc, whether the ECC error correction failed due to damage of row ECC error correction information in the management information file and row ECC error correction information for a same portion in the backup file is intact, first error correction judgment means for judging, when the row ECC error correction information is intact, whether the ECC error correction succeeds by using the row ECC error correction information in the backup file as the row ECC error correction information in the management information file, second error correction judgment means for judging, in a case where the ECC error correction failed and when a portion where the ECC error correction failed is specified and the portion does not overlap in the management information file and in the backup file, whether all ECC error corrections succeed by merging the portion with a portion where the ECC error correction succeeded, third error correction judgment means for tentatively performing padding in the portion where the ECC error correction failed even by the merging, and judging whether the ECC error correction succeeds by estimation based on a file size for the portion where the padding was performed, and file writing means for newly writing a correct management information file at an address different from an originally assigned address when the optical disc is a re-writable optical disc upon judgment of a success of the ECC error correction by any of the first, second, and third error correction judgment means. Hence, even when both the management information file and the backup file have flaws or dirt, the management information can be obtained accurately at a higher possibility. In addition, it is possible to write correct management information anew.

As has been described, according to the invention, the system controller is provided, which includes error correction information judgment means for judging, when an ECC error correction fails in both a management information file and a backup file of this file in an optical disc, whether the ECC error correction failed due to damage of row ECC error correction information in the management information file and row ECC error correction information for a same portion in the backup file is intact, first error correction judgment means for judging, when the row ECC error correction information is intact, whether the ECC error correction succeeds by using the row ECC error correction information in the backup file as the row ECC error correction information in the management information file, second error correction judgment means for judging, in a case where the ECC error correction failed and when a portion where the ECC error correction failed is specified and the portion does not overlap in the management information file and in the backup file, whether all ECC error corrections succeed by merging the portion with a portion where the ECC error correction succeeded, third error correction judgment means for tentatively performing padding in the portion where the ECC error correction failed even by the merging, and judging whether the ECC error correction succeeds by estimation based on a file size for the portion where the padding was performed, and file writing means for newly writing a correct management information file at an address different from an originally assigned address when the optical disc is a re-writable optical disc upon judgment of a success of the ECC error correction by any of the first, second, and third error correction judgment means. Hence, when an ECC error correction fails in both the management information file and the backup file due to flaws or the like, the ECC error correction can be performed more accurately. In addition, even when the ECC error correction failed, the ECC error correction is performed by estimation based on the file size for the portion where the correction failed.

Hence, even when both the management information file and the backup file have flaws or dirt, the management information can be obtained accurately at a higher possibility. In addition, when the optical disc is a re-writable optical disc, such as a DVD-RW, by writing the correct management information anew, it is possible to play the optical disc by another optical disc reproducing apparatus, such as a DVD player.

Also, according to the invention, the system controller is provided, which performs an ECC error correction by merging ECC error correction information in two files when an ECC error correction fails in both a management information file and a backup file of this file in an optical disc, and even when the ECC error correction fails, the system controller performs the ECC error correction by estimation based on other information for a portion where the correction failed. Hence, when an ECC error correction fails in both the management information file and the backup file due to flaws or the like, the ECC error correction can be performed more accurately. Also, even when the ECC error correction failed, the ECC error correction is performed by estimation based on the file size for the portion where the correction failed. Hence, even when both the management information file and the backup file have flaws or dirt, the management information can be obtained accurately at a higher possibility. In addition, when the optical disc is a re-writable optical disc, such as a DVD-RW, by writing the correct management information anew, it is possible to play the optical disc by another optical disc reproducing apparatus, such as a DVD player.

BRIEF DESCRIPTION OF THE DRAWINGS

FIG. 3 is a view showing the content of VMGI_MAT in the embodiment; and

DETAILED DESCRIPTION OF THE INVENTION

Figure 1:
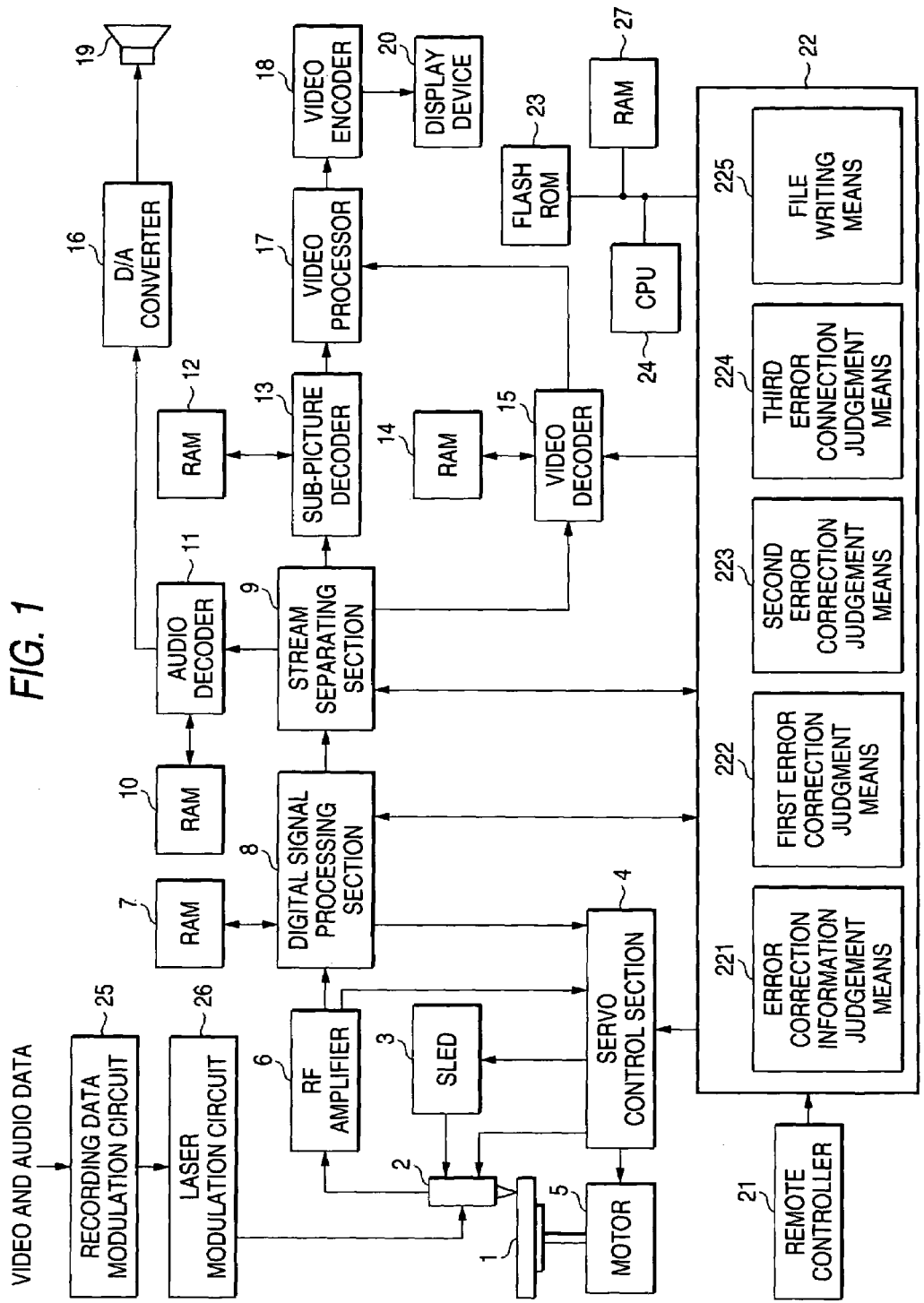
FIG. 1 is a block diagram showing the configuration of an optical disc recording and reproducing apparatus according to one embodiment of the invention.

Hereinafter, one embodiment of the invention will be described with reference to the accompanying drawings. FIG. 1 is a block diagram showing the configuration of an optical disc recording and reproducing apparatus according to one embodiment of the invention.

The optical disc recording and reproducing apparatus includes a spindle motor 5 that rotates an optical disc 1, an optical pickup 2 that emits a laser beam for recording/reproducing information in/from the optical disc 1 and receives reflected light from the optical disc 1, a thread 3 that moves the optical pickup 2 in the radius direction of the optical disc 1, and a servo control section 4 that drives the spindle motor 5 and the thread 3 and controls the focal position of a laser beam to move in the vertical direction and the horizontal direction with respect to the recording surface of the optical disc 1 by moving an objective lens (not shown) incorporated into the optical pickup 2 according to commands from a system controller 22.

The optical disc recording and reproducing apparatus also includes an RF amplifier 6 that amplifies an RF signal, which is a read signal from the optical pickup 2, while the optical disc 1 is played, a digital signal processing section 8 that generates data by performing signal decoding processing and ECC error correction processing according to the data format of the optical disc 1 after the RF signal outputted from the RF amplifier 6 is converted to digital data and stores the data thus generated into a RAM 7, and a stream separation section 9 that separates a data stream outputted from the digital signal processing section 8 into audio data, sub-picture data, and video data according to a command from the system controller 22.

The optical disc recording and reproducing apparatus also includes an audio decoder 11 that performs certain decoding processing upon input of the audio data outputted from the stream separation section 9, a RAM 10 that temporarily stores data for the decoding processing to be performed in the audio decoder 11, a sub-picture decoder 13 that performs certain decoding processing upon input of the sub-picture data outputted from the stream separation section 9, a RAM 12 that temporarily stores data for the decoding processing to be performed in the sub-picture decoder 13, a video decoder 15 that performs certain decoding processing upon input of the video data outputted from the stream separation section 9, and a RAM 14 that temporarily stores data for the decoding processing to be performed in the video decoder 15.

The optical disc recording and reproducing apparatus also includes a video processor 17 that synthesizes data outputted from the video decoder 15 and the data outputted from the sub-picture decoder 13 according to a command from the system controller 22, a video encoder 18 that converts the synthesized data outputted from the video processor 17 into a video signal for display for an image to be displayed on a display device 20, and a digital-to-analog converter 16 that converts data outputted from the audio decoder 11 to an analog audio signal to be supplied, for example, to speakers 19.

The optical disc recording and reproducing apparatus also includes a remote controller 21 provided with various manipulation keys to provide commands to the system controller 22 using infrared signals, such as a play key for providing a play command, a stop key for instructing to stop playing, and a record key for providing a record command, and a power supply key, and the system controller 22 that controls the overall apparatus.

The optical disc recording and reproducing apparatus also includes a flash ROM 23 that has stored programs and data to control respective components forming the apparatus and to control the overall apparatus, a CPU 24 that controls the system controller 22 by performing computation processing according to the programs and data in the flash ROM 23, and a RAM 27 that temporarily stores data needed for the processing by the CPU 24.

The optical disc recording and reproducing apparatus also includes a recording data modulation circuit 25 that modulates video and audio data sent from an unillustrated TV receiver or personal computer for the data to be recorded in the optical disc 1, and a laser modulation circuit 26 that outputs a laser modulation signal, which modulates a laser beam emitted from the optical pickup 2 according to modulation data modulated in the recording data modulation circuit 25, to the optical pickup 2.

The system controller 22 includes, as the components that characterize this embodiment error correction information judgment means 221 for judging, when an ECC error correction fails in both the management information file and the backup file of this file in the optical disc 1, whether the ECC error correction failed due to damage of row ECC error correction information in the management information file and row ECC error correction information for the same portion in the backup file is intact, and first error correction judgment means 222 for judging, when the row ECC error correction information is intact, whether the ECC error correction succeeds by using the row ECC error correction information in the backup file as the row ECC error correction information in the management information file.

The system controller 22 also includes second error correction judgment means 223 for judging, in a case where the ECC error correction failed and when a portion where the ECC error correction failed is specified and this portion does not overlap in the management information file and in the backup file, whether all the ECC error corrections succeed by merging this portion with a portion where the ECC error correction succeeded, third error correction judgment means 224 for tentatively performing padding in the potion where the ECC error correction failed even by the merging, and judging whether the ECC error correction succeeds by estimation based on a file size for the portion where the padding was performed, and file writing means 225 for newly writing a correct management information file at an address different from the originally assigned address when the optical disc 1 is a re-writable optical disc (DVD-RW) upon judgment of a success of the ECC error correction by any of the first, second, and third error correction judgment means 222, 223, and 224.

Figure 2:
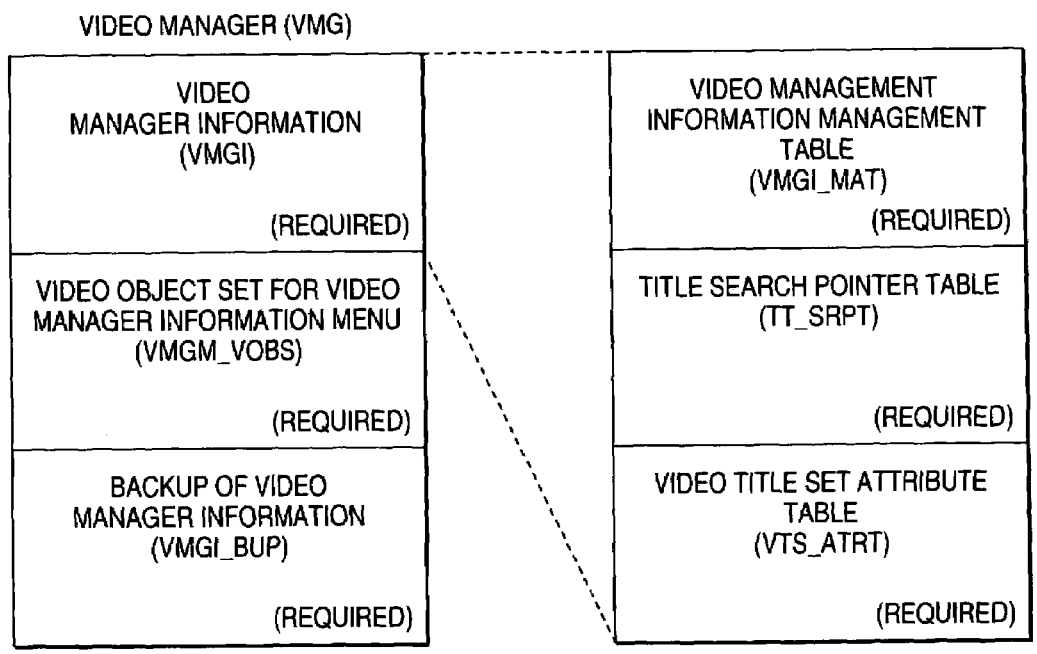
FIG. 2 is a view showing the data structure of a video manager (VMG) in the embodiment.

FIG. 2 is a view showing the data structure of a video manager (VMG) in this embodiment. The video manager (VMG) is made of video manager information (VMGI), a video object set for a video manager information menu (VMGM_VOBS), and a backup (VMGI_BUP) of the video manager information. The video manager information (VMGI) is made of a video management information management table (VMGI_MAT), a title search pointer table (TT_SRPT), and a video title set attribute table (VTS_ATRT).

FIG. 3 is a view showing the content of VMGI_MAT in this embodiment. As is shown in FIG. 3, VMG_ID is an identifier to specify VMG information. VMGI_SZ specifies the size of VMGI. VERN specifies the version number of the DVD standard. VMG_CAT specifies a video manager category, and for example, a flag indicating whether copying is prohibited is written therein. VLMS_ID is an identifier to specify a volume set. VTS_Ns specifies the number of VTS. PVR_ID is an identifier to specify a data provider. VMGM_VOBS_SA specifies the start address of VMGM_VOBS. VMGI_MAT_EA specifies the end address of VMGI_MAT. TT_SRPT_SA specifies the start address of TT_SPRT.

VTS_ATRT_SA specifies the start address of VTS_ATRT. VMGM_V_ATR, VMGM_AST_Ns, VMGM_AST_ATR, VMGM_SPST_Ns, and VMGM_SPST_ATR specify, respectively, a video attribute, the number of audio streams, an audio stream attribute, the number of sub-picture streams, and a sub-picture stream attribute of/in VMGM.

Figure 4:
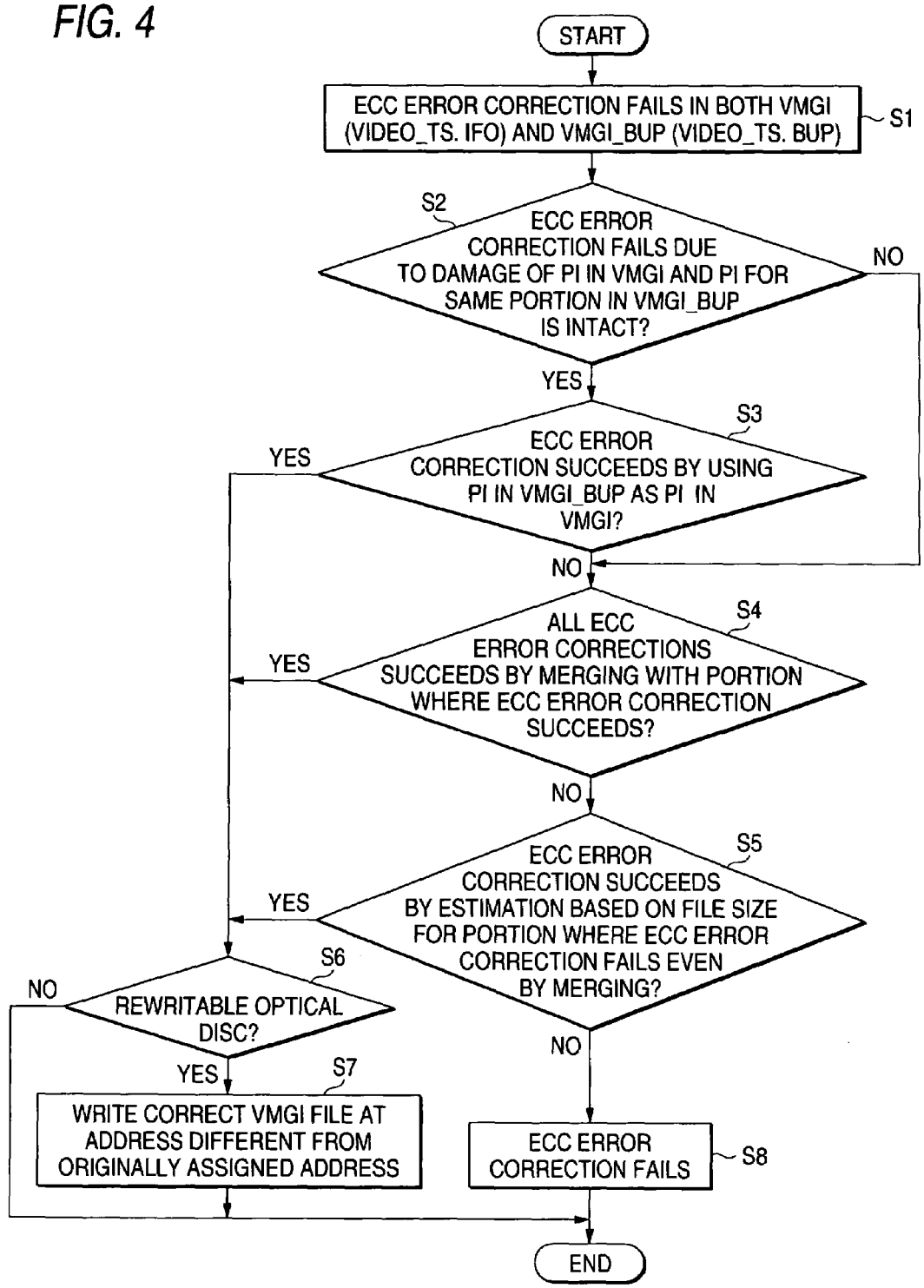
FIG. 4 is a flowchart used to describe processing of an ECC error correction when file management information is read from an optical disc in the embodiment.

FIG. 4 is a flowchart used to describe the processing of an ECC error correction when the file management information is read from the optical disc in this embodiment. The processing of an ECC error correction when the file management information is read from the optical disc will be described with reference to the flowchart.

When information is reproduced from the optical disc 1, the optical disc recording and reproducing apparatus first reads the management information file from the optical disc 1, and when the data of the management information file has an error, the apparatus tries to perform an ECC error correction in the digital signal processing section 8. However, when the management information file has a flaw or dirt, the ECC error correction fails. The apparatus therefore reads the backup file next, and tries to perform the ECC error correction. However, when the backup file has a flaw or dirt, too, the ECC error correction fails as well.

More specifically, when an ECC error correction fails in both VMGI (VIDEO_TS.IFO) contained in the management information file and VMGI_BUP (VIDEO_TS.BUP) contained in the backup file (Step S1), the error correction information judgment means 221 in the system controller 22 judges whether the ECC error correction failed due to damage of PI (row ECC error correction information) in VMGI and PI for the same portion in VMGI_BUP is intact (Step S2).

When PI is intact, the first error correction judgment means 222 judges whether the ECC error correction succeeds by using PI in VMGI_BUP as PI in VMGI (Step S3). In a case where this ECC error correction fails and when a portion where the ECC error correction failed is specified and this portion does not overlap in VMGI and in VMGI_BUP, the second error correction judgment means 223 judges whether all the ECC error corrections succeed by merging this portion with a portions where the ECC error correction succeeded (Step S4).

The third error correction judgment means 224 tentatively performs padding (makes the portion empty) in the portion where the ECC error correction failed even by the merging, and judges whether the ECC error correction succeeds by estimation based on the file size (VMGI_SZ) for this portion where the padding was performed (Step S5). For example, VMG_EA (corresponds to VMGI_MAT_EA in FIG. 3) within VMGI_MAT can be estimated on the basis of the file size (corresponds to VMGI_SZ in FIG. 3) written in the UDF (Universal Disc Format).

When the success of the ECC error correction is judged in any of Steps S3, S4, and S5, in a case where the optical disc 1 is a re-writable optical disc (Step S6), the file writing means 225 newly writes the correct management information file at an address different from the originally assigned address (Step S7), whereupon this processing ends.

In Step S2, when the ECC error correction failed due to damage of PI (row ECC error correction information) in VMGI and PI for the same portion in VMGI_BUP is not intact, the flow skips to Step S4. For the portion where the ECC error correction failed even by the merging, the ECC error correction also fails by estimation based on the file size (VMGI_SZ) in Step S5. This processing therefore ends while the ECC error is left uncorrected (Step S8).

As has been described, according to this embodiment, when an ECC error correction fails in both the management information file and the backup file due to flaws of the like, the ECC error correction can be performed more accurately by merging ECC information in these files. Also, even when the ECC error correction fails, the ECC error correction is performed for this portion where the correction failed by estimation based on the file size. Hence, even when both the management information file and the backup file have flaws or dirt, the management information can be obtained accurately at a higher possibility. In addition, when the optical disc is a re-writable optical disc, such as a DVD-RW, by writing the correct management information anew, it is possible to play the optical disc by another optical disc reproducing apparatus, such as a DVD player.

What is claimed is:

1. An optical disc recording and reproducing apparatus that records/reproduces information in/from an optical disc, comprising a system controller which includes:
   an error correction information judgment unit that judges, when an ECC error correction fails in both a management information file and a backup file of the management information file in an optical disc, whether the ECC error correction fails due to damage of row ECC error correction information in the management information file and row ECC error correction information for a same portion in the backup file is intact;
   a first error correction judgment unit that judges, when the row ECC error correction information is intact, whether the ECC error correction succeeds by using the row ECC error correction information in the backup file as a row ECC error correction information in the management information file;

a second error correction judgment unit that judges, when the ECC error correction fails and when a portion where the ECC error correction fails is specified and the portion does not overlap in the management information file and in the backup file, whether all ECC error corrections succeed by merging the portion with a portion where the ECC error correction succeeds;

a third error correction judgment unit that tentatively performs padding in the portion where the ECC error correction fails even by the merging, and judges whether the ECC error correction succeeds by estimation based on a file size for the portion where the padding was performed; and a file writing unit that newly writes a correct management information file at an address different from an originally assigned address, when the optical disc is a re-writable optical disc and when it is judged that the ECC error correction succeeds by any of the first, second, and third error correction judgment units.

2. An optical disc recording and reproducing apparatus that records/reproduces information in/from an optical disc, comprising a system controller that, when the ECC error correction fail in both a management information file and a backup file of the information management file in an optical disc, performs an ECC error correction by merging ECC error correction information in the two files wherein even when the ECC error correction fails, the system controller performs the ECC error correction by estimation based on other information for a portion where the correction fails.

3. The optical disc recording and reproducing apparatus according to claim 2, wherein the other information is a file size.

4. The optical disc recording and reproducing apparatus according to claim 2, wherein the system controller further includes:

an error correction information judgment unit that judges, when the ECC error correction fails in both the management information file and the backup file of the management information file in the optical disc, whether the ECC error correction fails due to damage of row ECC error correction information in the management information file and row ECC error correction information for a same portion in the backup file is intact;

a first error correction judgment unit that judges, when the row ECC error correction information is intact, whether the ECC error correction succeeds by using the row ECC error correction information in the backup file as a row ECC error correction information in the management information file;

a second error correction judgment unit that judges, when the ECC error correction fails and when a portion where the ECC error correction fails is specified and the portion does not overlap in the management information file and in the backup file, whether all ECC error corrections succeed by merging the portion with a portion where the ECC error correction succeeds;

a third error correction judgment unit that tentatively performs padding in the portion where the ECC error correction fails even by the merging, and judges whether the ECC error correction succeeds by estimation based on a file size for the portion where the padding was performed; and a file writing unit that newly writes a correct management information file at an address different from an originally assigned address, when the optical disc is a rewritable optical disc and when it is judged that the ECC error correction succeeds by any of the first, second, and third error correction judgment units.

* * * * *